(12) United States Patent
Steele

(10) Patent No.: US 7,703,239 B2
(45) Date of Patent: Apr. 27, 2010

(54) VERTICAL-MOUNT LAMINAR PLANTER

(76) Inventor: Christopher James Steele, 800 W. 31st St., Richmond, VA (US) 23225

( * ) Notice: Subject to any disclaimer, the term of this patent is extended or adjusted under 35 U.S.C. 154(b) by 260 days.

(21) Appl. No.: 12/069,810

(22) Filed: Feb. 13, 2008

(65) Prior Publication Data

US 2008/0202027 A1   Aug. 28, 2008

Related U.S. Application Data

(60) Provisional application No. 60/901,104, filed on Feb. 14, 2007.

(51) Int. Cl.
*A01G 9/02* (2006.01)
(52) U.S. Cl. ........................................ 47/65.8
(58) Field of Classification Search .................. 47/65.8, 47/65.9, 66.5, 67, 82, 83
See application file for complete search history.

(56) References Cited

U.S. PATENT DOCUMENTS

| | | |
|---|---|---|
| 4,268,994 A | 5/1981 | Urai |
| 4,380,136 A | 4/1983 | Karpisek |
| 4,419,843 A | 12/1983 | Johnson, Sr. |
| 4,920,695 A | 5/1990 | Garden |
| 4,961,284 A | 10/1990 | Williams |
| 4,986,027 A | 1/1991 | Harvey |
| 5,031,359 A | 7/1991 | Moffett, Jr. |
| 5,363,594 A | 11/1994 | Davis |
| 5,555,676 A | 9/1996 | Lund |
| 5,579,603 A * | 12/1996 | Fukuzumi ................ 47/58.1 R |
| 6,041,546 A | 3/2000 | Baranova |
| 6,298,600 B1 | 10/2001 | Feldman |
| 7,047,691 B2 * | 5/2006 | Schneider et al. ............ 47/65.8 |
| 2003/0044242 A1 * | 3/2003 | Chen ...................... 405/302.6 |
| 2007/0227066 A1 | 10/2007 | Crawford |
| 2008/0202027 A1 * | 8/2008 | Steele .......................... 47/82 |

FOREIGN PATENT DOCUMENTS

| | | | |
|---|---|---|---|
| DE | 3607772 A1 * | 8/1986 | |
| EP | 393735 A1 * | 10/1990 | |
| FR | 2680626 | 3/1993 | |
| FR | 2903274 A1 * | 1/2008 | |
| GB | 1486553 | 9/1977 | |
| GB | 2224191 A * | 5/1990 | |
| JP | 8289669 | 11/1996 | |
| JP | 410325143 A * | 12/1998 | |
| JP | 2000069854 A * | 3/2000 | |
| JP | 2004141174 A * | 5/2004 | |

OTHER PUBLICATIONS

Vertical Gardens of Patrick Blanc Website citation at http://www.dnaindia.com/report.asp?NewsID=1037720.

* cited by examiner

*Primary Examiner*—Francis T Palo

(57) ABSTRACT

A planter for living plants, composed substantially of a wall-facing layer (16), one or more drainage layers (14) and a front comprised of one or more plant-root retaining panels (12), held together in close proximity in a laminar, vertically oriented, array. The planter allows plants to be planted in, and grow from, the front vertical surface of the planter.

16 Claims, 3 Drawing Sheets

VERTICAL-MOUNT LAMINAR PLANTER

This application claims priority based on U.S. provisional application 60/901,104, filed Feb. 14, 2007, all of which is incorporated herein by reference.

BACKGROUND

1. Field of Invention

This invention relates to vertically-mounted planters. More particularly, this invention relates to planters in which living plants are grown from a vertical surface of the planter.

2. Description of Prior Art

Wall-mounted planters are in common usage, reflecting a widespread interest in growing plants in greater abundance and in novel locations. Less common, but reflecting the same interest, are wall-mounted planters in which plants are grown from the vertical surfaces of the planter. The prior art record also contains numerous examples of planters providing a vertical planting arrangement, which are not wall-mounted.

The use of wall-mounted planters allows the plant hobbyist to grow plants in more locations, both within the home and on walls and fences in the garden. The use of wall-mounted planters is also advantageous in that they are less likely to be disturbed or upset by pets and small children. Growing plants in a vertical arrangement offers further advantages in that foliage and flowers may be more easily viewed and appreciated.

Growing in a vertical arrangement is of particular advantage with certain orchid species which are less susceptible to crown rot when they are grown from a vertical surface, as a result of the decreased likelihood that water will collect in the crown.

There are several key areas in which improvements are needed in advancing the art of wall-mounted and vertical planters. Among these are:
 assuring appropriate provision of moisture to, and drainage from, the root zone;
 maintaining the porosity of the growing media; and
 preventing spillage of growing media, especially at the aperture from which the plant grows.

Advances in wall-mounted and vertical planters are also sought to increase the decorative quality of planters.

Provision of moisture is a critical requirement for any planter that is to be used to maintain living plants. A vertically-oriented planter presents additional challenges related to providing adequate, and relatively uniform, distribution of moisture within the root zone of the planter.

A variety of mechanisms have been developed by inventors for providing moisture in vertical planters. Commonly used are reservoirs that release water into the root zone of the planter by gravity, or through the use of wicks, tubing, pipes or some combination of these. Such designs will also typically provide for an overflow trough to catch water as it drains from the root zone. Some planters provide recirculating watering systems in which a pump is used to move water from the overflow trough back into a reservoir or water distribution system.

Several problems arise in using planters incorporating these features. Water distribution systems, such as wicks and tubing, tend to distribute water unevenly, often resulting in some areas of the root zone being over-saturated, while other areas receive inadequate moisture. To compensate for this uneven distribution, planters have been developed which continuously saturate the entire root zone, essentially overwhelming any tendency to uneven distribution. This may be acceptable for certain types of plants, but will damage plants that require some drying between waterings. Planters with reservoirs and overflow troughs are likely to spill water, and possibly suffer breakage, if the planter is upset. The overflow trough may itself overflow if too much water is introduced, resulting in wetting and potential damage to nearby furnishings. Planters incorporating tubing and pumps involve added complexity and the potential of mechanical failure, as well as increasing the cost of manufacture.

A different approach to providing moisture in a decorative planter is presented in U.S. Pat. No. 6,041,546 to Baranova (2000) which describes a planter in which moisture is retained and distributed using a water-absorbing gel. Baranova describes a pouch that is filled with water-absorbing gel, making up the entirety of the planter root zone. Baronova's planter is not suited to plants that resent a continuously saturated root zone or require some amount of drying between waterings. The planter disclosed by Baranova is not, however, suited to growing plants on a vertical surface, because the mouth of the planter must be maintained in an upright orientation. In addition, Baranova's planter is not able to accept larger plants or those that have significant root systems at the time they are planted.

A common concern in developing a new planter is the tendency of soil or planting media to settle, resulting in a compacted condition in the root zone, characterized by loss of porosity and diminished capacity for free drainage of water, possibly leading to anoxic conditions detrimental to the health of the plant. The problem of settling may be especially compounded in a vertically configured planter due to the increased relative height of the column of growing media compared to its breadth.

U.S. Pat. No. 4,268,994 to Urai (1981) presents one approach to the problems of settling and media compaction in a wall mounted vertical planter. In Urai's planter, planting media is interspersed with filler material in an attempt to maintain the shape of the cultivation body and prevent settling of media.

In practice, the layering of materials described by Urai is not sufficient to prevent settling of growing media without the application of adhesive compounds to consolidate all elements of the cultivation body. This is suggested by the use of adhesives described in a dependent claim of Urai's invention. Urai's planter uses a water reservoir, overflow collection trough and moisture distribution based on wicks, pipes and pumps which present the problems attendant to these features outlined above. In addition, Urai's planter cannot accommodate introduction of larger plants or those with developed root systems at the time of planting. Urai's planter is instead intended for planting seeds, seedlings or cuttings.

A different approach to the problem of media settling in vertical planters is taken by Patrick Blanc of France whose methods are partially described in a variety of publications. Blanc substantially eliminates the use of loose growing media in his planting system. Blanc instead plants directly into a synthetic felt material that is affixed to a water-impervious vertical surface. In Blanc's method, water and nutrients are supplied to the plants through a recirculating drip irrigation system. While Blanc's method is well adapted to permanent installations covering large vertical surfaces, it is not suited to smaller movable planters. Blanc's system offers minimal reserves of moisture within the root zone, leaving plants vulnerable to desiccation if the drip irrigation system fails to operate.

Another focus of concern in the advancement of vertically-oriented planters is to prevent spillage of growing media from the planter, especially at the aperture where the foliage of the plant emerges from the planter.

Some vertically-oriented planters provide restricted planting spaces where a portion of the growing media is presented with a small horizontal surface where the plant is grown. Exemplary of this form is French patent FR2680626 to Lassale (1993) in which small flexible pockets are affixed in a vertical array, with each pocket holding a small amount of growing media. A similar approach is taken in U.S. Pat. No. 4,419,843 to Johnson, Sr. (1983) in which multiple small horizontal planting areas are arranged to provide an overall vertical array. A somewhat different approach is taken in U.S. Pat. No. 5,555,676 to Lund (1996) in which ports are arrayed in a vertical planter which afford a small horizontal surface of growing media within an aperture on the vertical wall of the planter. All of these ways of containing growing media at the plant aperture depend on gravity to hold growing media in place. If the planter were tipped or overturned, planting media, and possibly plants, would spill out.

In some planters a vertical wall of the planter is a fabric material having holes or slits cut in its surface. A method of this kind is described in U.S. Pat. No. 4,961,284 to Williams (1990). This simple method may be effective in preventing spillage of growing media, but does not offer a way to insert larger plant material or plants which have significant root systems at the time of planting. A variation on this approach is described in U.S. patent application 20070227066 from Crawford (2007). Crawford provides pre-cut holes in a flexible liner to allow insertion of the root ball of a developed plant. Crawford's method does not allow for the pre-cut hole to be adjusted to accommodate variations in the size and shape of the root-ball of the plant. Crawford's method is also a less secure system for preventing spillage of growing media in that it depends on the integrity of the plant root ball at the time of planting. In addition, Crawford's method requires access to the interior of the planter through an open top during the process of planting.

Some inventors have described vertical planters in which small planting apertures are arrayed on a vertical face of the planter as in U.S. Pat. No. 5,363,594 to Davis (1994). In some cases, apertures in the vertical surface may be fitted with removable closures, or alternately open-or-closed ports. Exemplars of this approach may be seen in U.S. Pat. No. 5,031,359 to Moffett, Jr. (1991) and U.S. Pat. No. 4,920,695 to Garden (1990). Mechanisms of this kind do prevent spillage of media from unused planting apertures, but offer no protection against spillage from apertures where a plant is inserted. In addition, these mechanisms cannot readily be adjusted to accommodate larger plant material or plants with developed root systems.

A more refined approach to preventing loss of growing media from the planting aperture is described in U.S. Pat. No. 6,298,600 to Feldman (2001). Feldman discloses a planter with a down-facing plant aperture. To retain growing media from falling from the aperture, Feldman describes pliable perforated plates used as a medium retention device which substantially seals the space between the stem of the plant and the edge of the aperture. A similar mechanism, applied in a vertical planter, is described in Japanese patent JP8289669 to Murayama (1996). Murayama describes a sheet member fitted to a planting aperture for the purpose of preventing loss of soil from the planter. While both Feldman and Marayama provide a more reliable means of preventing spillage of growing media, neither of these inventions is suited to the planting of larger plant material or plants with developed root systems. Feldman's invention also requires access to the interior of the planter through an open top during the process of planting.

With regard to the advancement of the decorative quality of vertical-oriented planters it must be acknowledged that esthetics are subjective. However, it may be fairly noted that many of the vertical planters referenced here were intended for outdoor use in growing vegetable crops or seasonal flowers. Most of these would not be appropriate for indoor use. Many would also not be suitable, because of their construction, for mounting on a wall.

Accordingly, several objects and advantages of the present invention are:

a) to provide a vertical-mounted planter in which plants grow from the facing surface;

b) to provide a planter which will eliminate excessive liquid water retention in the plant root-zone, thereby reducing plant disease and death associated with overwatering;

c) to provide a planter with an improved environment for the effective use of water-absorbing gel for the purpose of moisture retention and disbursement;

d) to provide a planter which can be displayed and maintained on a vertical surface;

e) to provide a planter which serves to maintain the shape and porosity of planting media in the planter root zone, f) to provide a planter which minimizes the potential for spills and mess;

g) to provide a vertical-mounted planter which can accommodate planting of larger plants and plants with developed root systems;

h) to provide a vertical-mounted planter which can be easily planted through the facing surface of the planter; and i) to provide a planter with enhanced decorative qualities.

Further objects and advantages will become apparent from consideration of the ensuing description and drawings.

SUMMARY OF THE INVENTION

The invention consists substantially of an array of laminar elements suitable for supporting living plants growing from the vertical front-face of the planter. These laminar elements are comprised of a wall-facing layer, one or more drainage layers, and a front comprised of one or more plant-root retaining panels. One or more plants are grown from the front face of the planter through apertures among the plant-root retaining panels.

The layers of this laminar array are held together, in such a way that compressed voids, between the layers remain within which granular material, such as growing media and water-absorbing gel, may be interposed and held securely in place. The layers are held together by holding means, such as adhesive, glue, pins, tacks, stitching, etc., which are applied to the facing surfaces of the layers, primarily near the perimeter edge.

The invention is best understood from the following detailed description and appended claims taken in conjunction with the accompanying drawings wherein like parts are designated by like numbers throughout.

DRAWINGS

Reference Numerals

10—vertical-mount laminar planter
12—plant-root retaining panel
14—drainage layer
14.1—drainage layer void
16—wall-facing layer
18—hanging means
20—spacing means
24—securing means
26—water-absorbing gel
28—growing media
30—plant

DETAILED DESCRIPTION

Figure 1:
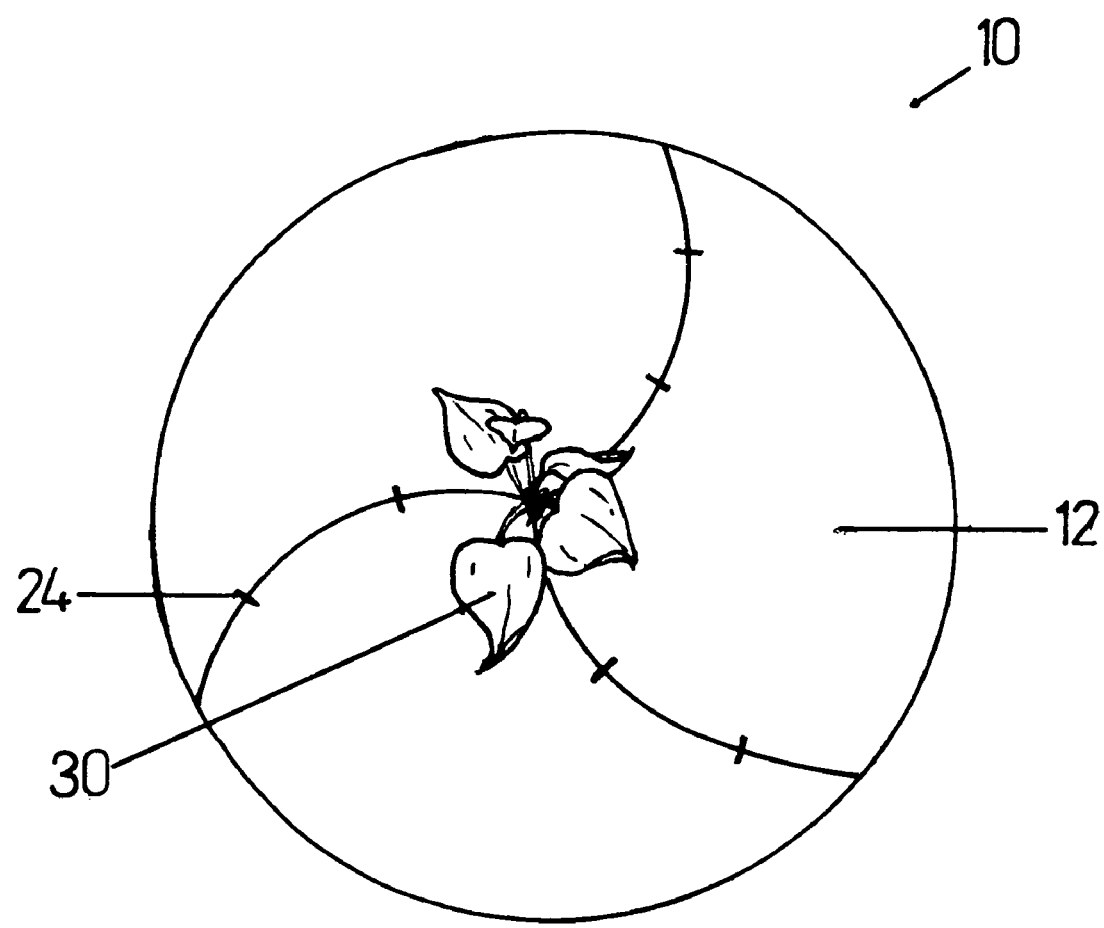
FIG. 1—Front view showing the invention.
Figure 2:
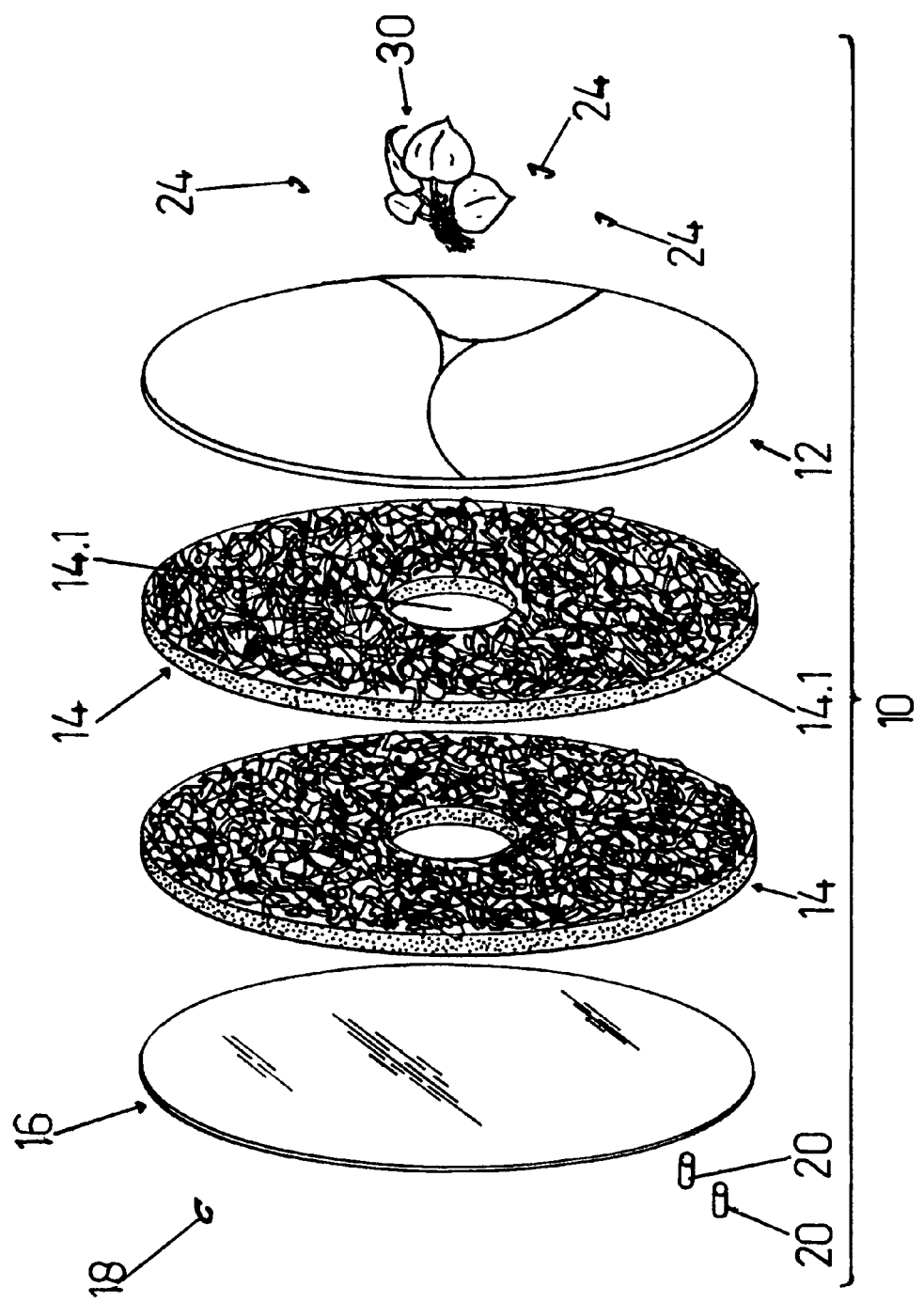
FIG. 2—Exploded view showing components of the claimed planter.
Figure 3:
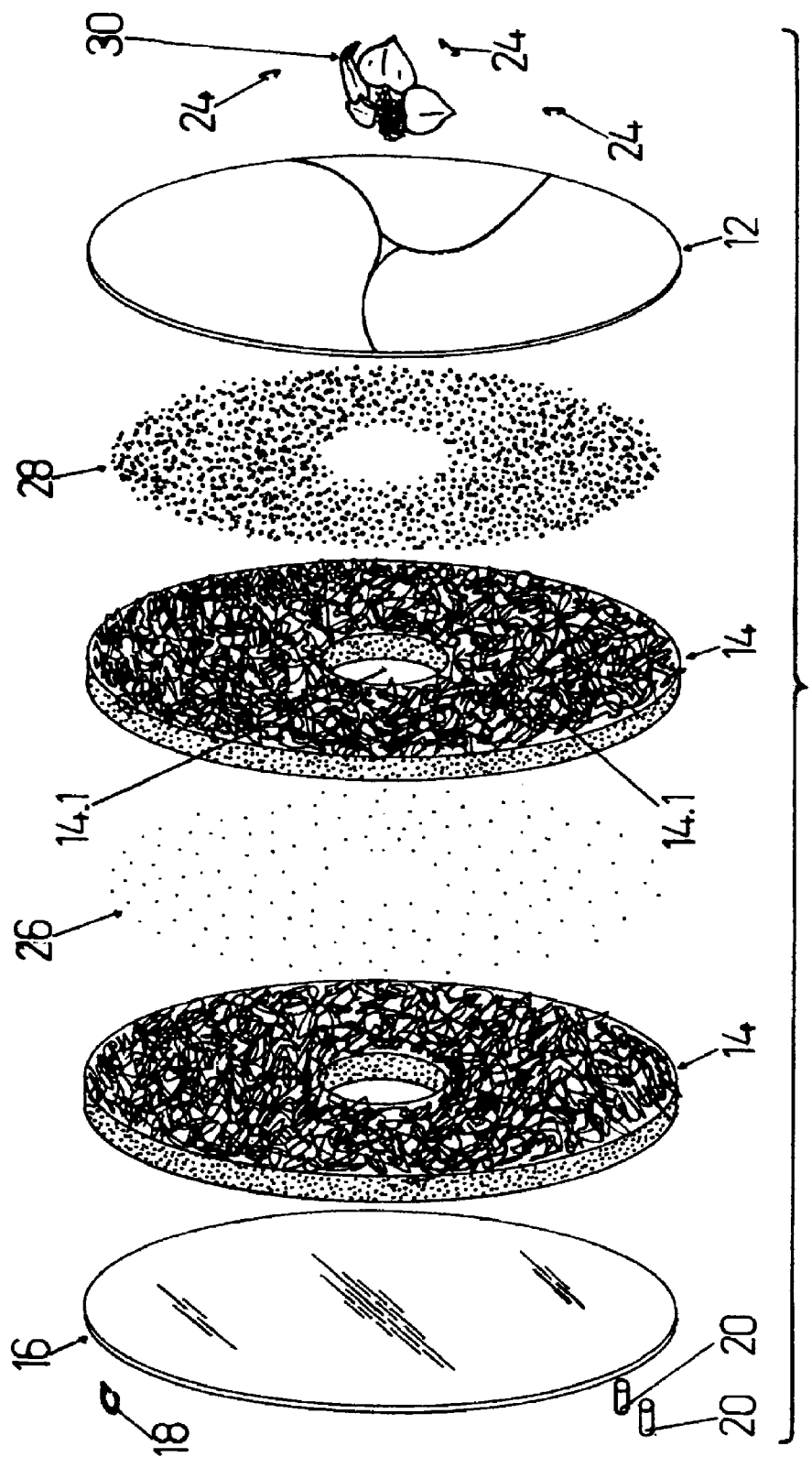
FIG. 3—Exploded view of a preferred embodiment of the invention.

FIGS. 1 to 3

FIG. 1 is a front view showing the front of a typical embodiment of claimed planter 10. Plant 30, to be installed by the user, extends its foliage from the front of the planter, as shown. In this embodiment, plant-root retaining panels 12 substantially cover the front of the planter in an overlapping pattern with an opening between their edges through which plant 30 emerges. In this embodiment, securing means 24 are "C"-shaped metal hooks.

FIG. 2 presents an exploded view of the claimed planter, showing a wall-facing layer 16 at the back, drainage layers 14, and plant-root retaining panels 12 making up the front of the planter. Extending from the back surface of wall-facing layer 16 are one or more hanging means 18 by which the planter may be suspended from a wall. In this embodiment of the planter, hanging means 18 is a simple metal bail connected to wall-facing layer 16. Also extending from the back surface of wall-facing layer 16 are one or more spacing means 20 which interpose between the back of the planter and the vertical surface on which it hangs. In this embodiment of the planter, spacing means 20 consist of 2 plastic studs attached to wall-facing layer 16. Wall-facing layer 16 may be a solid panel or a coating applied to drainage layer 14.

Drainage layer 14 is composed of a porous material which readily allows the passage of air and water, resists breakdown in wet conditions and is non-toxic to plants. Suitable materials for drainage layer 14 include any of: polyester and acrylic tangle material, adhered synthetic fibers, natural fibers, glass, ceramic, metal, plastic, stone, any other suitable material or any combination of these. Drainage layer 14 may have one, or more, voids 14.1.

In the embodiment of the claimed planter shown in FIG. 1 and FIG. 2 wall-facing layer 16, drainage layer 14 and plant-root retaining panels 12, are held in close proximity to each other, in a layered array, by holding means (not shown) such as adhesive, glue, pins, tacks, stitching, etc. In this embodiment, adhesive (not shown) is used as a holding means to connect the back face of plant-root retaining panels 12 to the perimeter of the front face of drainage layer 14. Adhesive further connects the perimeter of the back face of drainage layer 14 to the perimeter of the front face of a second drainage layer 14. Adhesive further connects the back surface of second drainage layer 14 to the front face of wall-facing layer 16. As a result of these adhesive connections, in this embodiment of the claimed planter, a compressed void is formed between the laminar elements which remains empty and accessible through the aperture among the plant-root retaining panels 12.

In this embodiment of the claimed planter, slightly elastic resistance to bending and stretching among drainage layer 14 and plant-root retaining panels 12 is counterpoised with tension imposed by holding means and securing means 24 in a way that securely holds in place granular materials interposed between the laminar elements.

In alternate embodiments of the claimed planter, holding means may be applied to the laminar elements in variant patterns, such that they are held in close proximity in a laminar array, producing compressed voids among them, while permitting access to these voids through apertures among plant-root retaining panels 12.

FIG. 3 presents an exploded view of a preferred embodiment of the claimed planter, showing growing media 28, and water-absorbing gel 26, interposed between the laminar elements. This embodiment shows growing media 28 interposed between drainage layer 14 and the front of the planter, comprised of 3 plant-root retaining panels 12.

Alternate embodiments may include one or more additional drainage layers 14 within the laminar array. In alternate embodiments, water-absorbing gel 26 and growing media 28 may be interposed in any order, or interposed as a mixture, within the laminar array.

Water-absorbing gel 26 is a hydrophilic polymer consisting of any of cross-linked acrylamide/acrylic acid copolymers, cross-linked acrylamide/potassium acrylate copolymers, and polyacrylamides. Planting media 28 is any granular material capable of effectively supporting the roots of living plants.

In a preferred embodiment of the claimed planter the connection, provided by holding means, among wall-facing layer 16, drainage layer 14 and plant-root retaining panel 12 is sufficient to provide secure holding of granular materials interposed between them. In this embodiment, securing means 24 are not required and are therefore omitted.

In other embodiments of the claimed planter, securing means 24 may be any of: simple hooks, hook-and-eye, adhesives, hook-and-loop, buttons, snaps, zippers, other securing devices or a combination of these. By the variety of devices which may serve as securing means it will be understood that alternate embodiments of the claimed planter may allow securing means to connect among plant-root retaining panels in a variety of configurations, and changeably, and adjustably to accommodate varying plant sizes, and varying shapes and arrangements of plant-root retaining panels 12.

DETAILED DESCRIPTION OF OPERATION

FIGS. 1 to 3

The claimed planter is intended for use in growing, maintaining and displaying living plants.

Referring to FIG. 1 and FIG. 2, it may be seen that the functioning of the claimed planter, to meet the stated objects and advantages, requires that laminar elements, consisting of wall-facing layer 16, drainage layer 14 and plant-root retaining panel 12, be held together in close proximity to each other such that granular materials, such as growing media 28 and water-absorbing gel 26, may be held securely in position between and among them.

In a preferred embodiment of the claimed planter, slightly elastic resistance to bending and stretching among drainage layer 14 and plant-root retaining panel 12 is counterpoised with tension imposed by holding means (not shown) and securing means 24 in a way that enhances the effect of securely holding in place granular materials interposed between the laminar elements.

Wall-facing layer 16 serves to block, or limit, the flow of water from the back face of the claimed planter. Limiting water flow from the back of the planter serves to minimize the potential for water damage to the adjacent wall surface. Hanging means 18 is used to suspend the planter from a projection, such as a nail, on a wall or other vertical surface. Spacing means 20 are used to assure separation between the back of the planter and the wall. This has the effect of further protecting the wall from water damage.

The claimed planter is to be planted by the user. To plant the claimed planter the user may begin by adding growing media into the compressed void formed between the laminar elements. For example, the user may add growing media: in the space between drainage layer 14 and plant-root retaining panels 12, and in the space between drainage layer 14 and second drainage layer 14. Because of the laminar configuration and the close proximity of the laminar elements the extent of growing media will be limited to that which can be securely held therein. The user may elect to omit the addition of growing media entirely, opting instead to introduce the roots of the plant directly into the laminar array, relying on the user's judgement of the needs of the plant to be installed.

As shown in FIG. 1 and FIG. 2, plant 30 is to be positioned so that the stems and leaves of the plant extend away from the body of the planter, through a gap between plant-root retaining panels 12. Plant-root retaining panels 12 are secured to each other with securing means 24. Plant-root retaining panels 12 serve to hold the roots of plant 30 and growing media 28 securely in place and in close proximity to drainage layer 14. At the time of planting, and in the course of growing, the roots of plant 30 may extend through drainage layer voids 14.1 and into spaces between drainage layer 14 and second drainage layer 14.

Watering the claimed planter, after it is planted by the user, is accomplished by soaking it in a basin of water, or other plant-watering solution. After soaking, the planter is to be hung for draining, growing and display, with the long axis of drainage layer 14 in an approximately vertical orientation. Due to the relatively large expanse of freely draining material, all the free water will be drained from the claimed planter when hung in it's normal vertical orientation, except the water which is held by capillary forces in drainage layer voids 14.1, and that which is absorbed by growing media 28 and water-absorbing gel 26. Draining water from the claimed planter, after soaking, will require a period of time. This manner of watering offers several advantages. Because the entire planter is immersed in water all parts of the root zone will be fully saturated. By encouraging this watering regime the planter is regularly flushed, serving to remove build up of minerals in the root zone which may be detrimental to the plant. The drainage period, when water drains from the planter, serves to completely refresh the air within the planter, something which is also favorable to the health of many plants. As the root zone of the planter dries out, the plant is subjected to the natural water cycle of its native habitat.

By the inclusion of water-absorbing gel within the laminar array, the wet/dry cycle is moderated. The period of time between watering can be increased by including more water-absorbing gel. By closely holding water absorbing gel between layers within the planter the individual particles of gel are made more readily available to the roots of the plant. With water-absorbing gel dispersed among a free-draining array, the plant may selectively position its root development in relation to moisture availability within the planter.

The user may wish to hang the planter above a basin while it is draining. Once all the free water has drained, the planter can be suspended in it's normal location for growing and display.

Theory of Operation

The elements and configuration of the claimed planter are based on the common observation of container gardeners: "Over-watering is the most common cause of death in houseplants." Responding to this truism the claimed planter incorporates several features that significantly reduce the likelihood of overwatering. Central to the claimed planter are drainage layers of such composition as to allow free passage of air and water. By virtue of the vertical arrangement of the planter, the drainage layers are closely available to essentially all of the immediate zone around the roots of the plant. Any granular materials, such as growing media or water absorbing gel, are held tightly within a restricted zone closely available to an adjacent surface of a drainage layer. Since the granular material is held tightly between the layers it cannot settle or lose porosity. Unlike an ordinary plant container where most of the volume is devoted to granular material and a small amount to providing drainage, in the claimed planter most of the volume is devoted to providing free drainage and relatively little is devoted to granular material. As a result of this abundance of freely-draining material the potential for overwatering in this planter is minimized.

The approach to moisture management, as outlined above, consistent with the features of the claimed planter, are intended to more closely resemble the natural water cycle found in the natural habitat of many tropical plants. The common pattern in tropical zones where many common houseplants are native is a cycle of torrential rains interspersed with dry seasons. Specifically this is the habitat that is natural for epiphytic plants common in houseplant culture, including many tropical ferns and orchid species. These plants, living as they do in the branches of a tree, depend on rain. When rain does not come they must tolerate some degree of drying.

The elements and configuration of the claimed planter call for a watering regime that more closely imitates these natural conditions. Watering is accomplished by completely immersing the planter in water to assure that all parts of the planter are saturated. After soaking, the plant is hung to drain.

After draining, the only water in the planter is that which is held in the pores of the drainage layer, plus what has been absorbed by any growing media or water-absorbing gel. After this point, the moisture content of the planter will gradually decline as water is transpired by the plant and lost to evaporation. The use of water-absorbing gel in the planter slows the drying process and provides a reserve of moisture for the plant as the planter dries out.

Another element of the theory behind the claimed planter relates to the way plant roots respond to surfaces. In general, roots of houseplants tend to seek surfaces. It is common when replanting a houseplant to find that almost all of the roots of the plant are found at the outside edge of the rootball, adjacent to the inside of the container. It is often found that the interior of the rootball is virtually devoid of roots. It is the theory of the claimed planter that plant health and vigor will be favorably affected by maximizing the surfaces available to the plant roots within the container. Responding to this aspect of the theory of operation, the claimed planter presents a manifold increase in interior surface area compared to prior art planters.

SUMMARY, RAMIFICATIONS AND SCOPE

Considering again the key issues for advance in the art of wall-mounted and vertical planters, the claimed planter provides worthwhile advances in each:

With regard to provision of appropriate moisture levels and water drainage the claimed planter presents a wholly different approach to watering as compared to prior planters. Overwatering is eliminated by the extensive use of free draining laminar elements. All parts of the planter are supplied with water by virtue of the immersion watering method. The claimed planter functions to reduce plant failure associated with over-watering.

With regard to maintaining porosity, the claimed planter assures that no settling of granular material can occur by holding any granular elements in place within a laminar array of free draining material. Settling and loss of porosity are essentially eliminated.

With regard to minimizing the potential for spillage of growing media the claimed planter provides substantial advantages compared to prior art. Several features of the claimed planter contribute to this effect. Any granular materials are held in a secure and stable way, and their relative volume within the planter is substantially reduced compared to other planters. In addition, a positive closure is provided, at the aperture where the plant emerges from the planter, by the use of plant-root retaining panels. A positive securing of the closure is provided by securing means able to accommodate a range of sizes and configurations.

The claimed planter also reduces the risk for spills of water as compared to prior art. Since the claimed planter, after draining, contains no reservoir of liquid water there is nothing to spill if the planter happens to be upset or overturned.

With regard to increasing the decorative quality of planters, the claimed planter provides a surface on the outward face of the plant-root retaining panels where different fabrics, colors, textures and decoration may be employed to enhance the visual appeal of the planter, in conjunction with the living plant growing therein.

Responding to the specific objects stated above, the claimed planter presents the following advantages over prior art:

a) plants grow from the facing surface, allowing them to be viewed face-on in the fashion of a painting or other wall-mounted art;
b) excessive liquid water retention in the plant root-zone is eliminated, thereby reducing plant disease and death associated with overwatering;
c) an improved environment is provided for the effective use of water-absorbing gel by assuring free drainage, precluding anaerobic conditions while slowing moisture loss;
d) the planter can be displayed and maintained on a vertical surface, allowing additional space where plants can be grown and appreciated;
e) the planter serves to maintain the shape and porosity of planting media in the planter root zone,
f) the planter minimizes the potential for spills and mess;
g) the planter can accommodate larger plants and plants with developed root systems;
h) the planter can be easily planted through the facing surface of the planter; and
i) the planter offers enhanced decorative qualities and opportunities.

A further advantage of the claimed planter is its simple construction and its use of inexpensive materials and components, minimizing the cost of manufacture as compared to other planters which require the use of highly-engineered or mechanical components.

A further advantage of the claimed planter is that it is of simple construction, without the use of reservoirs, tubing, pumps and the like, making it less susceptible to breakage and mechanical failure, as compared to planters which require such components.

A further advantage of the claimed planter is that it does not depend on gravity to retain growing media within the planter. The claimed planter, once properly planted, can be inverted and shaken, with no significant damage or spillage.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description.

For example, the shape of the planter may vary from the circular shape shown in FIG. 1. Also, the extent of water flow restriction of the wall-facing layer may vary from one embodiment to another or may be variable in alternate embodiments.

Thus the scope of the invention should be determined by the appended claims and their legal equivalents, rather than by the examples given.

The invention claimed is:

1. A vertical-mounted laminar planter for supporting living plants in a vertically oriented array, comprising:
   one or more drainage layers of such composition as to permit substantially free passage of water and air;
   a wall-facing layer located at the back of said vertical-mounted laminar planter having the property of partially restricting the passage of water and air through said wall-facing layer;
   a front comprised of one or more plant-root retaining panels having arrayed among them one or more apertures for the growth of a living plant;
   securing means to securely attach said plant-root retaining panels to each other;
   one or more hanging means by which said vertical-mounted laminar planter may be suspended on a vertical surface, such as a wall;
   one or more spacing means extending from said wall-facing layer to said vertical surface when said vertical-mounted laminar planter is in its normal vertical-mounted position; and
   holding means by which said drainage layer, said wall-facing layer and said plant-root retaining panels, are disposed in such proximity to each other as to provide secure purchase for the roots of plants and to substantially hold in place granular growing media, interposed between and among said drainage layer, said wall-facing layer and said plant-root retaining panel, regardless of changes in the orientation of said vertical-mounted laminar planter relative to the pull of gravity.

2. The vertical-mounted laminar planter of claim 1 wherein said drainage layer is composed of a material selected from the group consisting of polyester/acrylic tangle material, synthetic fibers, adhered synthetic fibers, natural fibers, glass, ceramic, metal, plastic and stone.

3. The vertical-mounted laminar planter of claim 1 wherein said holding means is selected from the group consisting of adhesives, glue, synthetic fiber stitches, pins, tacks, wire, metal bindings and solid framing.

4. The vertical-mounted laminar planter of claim 1 wherein said wall-facing layer is a coating applied to a surface of a said drainage layer.

5. The vertical-mounted laminar planter of claim 1 wherein said securing means is selected from the group consisting of simple hooks, hook-and-eye, adhesives, hook-and-loop, buttons, snaps and zippers.

6. The vertical-mounted laminar planter of claim 1 wherein growing media is substantially held in place between and among said drainage layer, said wall-facing layer and said plant-root retaining panel, regardless of changes in the orientation of said vertical-mounted laminar planter relative to the pull of gravity.

7. The vertical-mounted laminar planter of claim 1 wherein water-absorbing gel is substantially held in place between and among said drainage layer, said wall-facing layer and said plant-root retaining panel, regardless of changes in the orientation of said vertical-mounted laminar planter relative to the pull of gravity.

8. The vertical-mounted laminar planter of claim 7 wherein said water-absorbing gel is a hydrophilic polymer selected from the group consisting of cross-linked acrylamide/acrylic acid copolymers, cross-linked acrylamide/potassium acrylate copolymers, and polyacrylamides.

9. A vertical-mounted laminar planter for supporting living plants in a vertically oriented array, comprising:
   one or more drainage layers of such composition as to permit substantially free passage of water and air;
   a wall-facing layer located at the back of said vertical-mounted laminar planter having the property of partially restricting the passage of water and air through said wall-facing layer;
   a front comprised of one or more plant-root retaining panels having arrayed among them one or more apertures for the growth of a living plant;
   one or more hanging means by which said vertical-mounted laminar planter may be suspended on a vertical surface, such as a wall;
   one or more spacing means extending from said wall-facing layer to said vertical surface when said vertical-mounted laminar planter is in its normal vertical-mounted position; and
   holding means by which said drainage layer, said wall-facing layer and said plant-root retaining panels, are disposed in such proximity to each other as to provide secure purchase for the roots of plants and to substantially hold in place granular growing media, between and among said drainage layer, said wall-facing layer and said plant-root retaining panel, regardless of changes in the orientation of said vertical-mounted laminar planter relative to the pull of gravity.

10. The vertical-mounted laminar planter of claim 9 wherein said drainage layer is composed of a material selected from the group consisting of polyester/acrylic tangle material, synthetic fibers, adhered synthetic fibers, natural fibers, glass, ceramic, metal, plastic and stone.

11. The vertical-mounted laminar planter of claim 9 wherein said holding means is selected from the group consisting of adhesives, glue, synthetic fiber stitches, pins, tacks, wire, metal bindings and solid framing.

12. The vertical-mounted laminar planter of claim 9 wherein said wall-facing layer is a coating applied to a surface of a said drainage layer.

13. The vertical-mounted laminar planter of claim 9 wherein said securing means is selected from the group consisting of simple hooks, hook-and-eye, adhesives, hook-and-loop, buttons, snaps and zippers.

14. The vertical-mounted laminar planter of claim 9 wherein growing media is substantially held in place between and among said drainage layer, said wall-facing layer and said plant-root retaining panel, regardless of changes in the orientation of said vertical-mounted laminar planter relative to the pull of gravity.

15. The vertical-mounted laminar planter of claim 9 wherein water-absorbing gel is substantially held in place between and among said drainage layer, said wall-facing layer and said plant-root retaining panel, regardless of changes in the orientation of said vertical-mounted laminar planter relative to the pull of gravity.

16. The vertical-mounted laminar planter of claim 15 wherein said water-absorbing gel is a hydrophilic polymer selected from the group consisting of cross-linked acrylamide/acrylic acid copolymers, cross-linked acrylamide/potassium acrylate copolymers, and polyacrylamides.

* * * * *